(12) United States Patent  
Yoshimoto et al.

(10) Patent No.: US 8,752,891 B2  
(45) Date of Patent: Jun. 17, 2014

(54) PLANAR HEATING DEVICE AND SEAT WITH SAME

(75) Inventors: Koji Yoshimoto, Nara (JP); Norio Abe, Nara (JP); Kazuaki Hioki, Osaka (JP); Hiroyuki Ogino, Nara (JP)

(73) Assignee: Panasonic Corporation, Tokyo (JP)

( * ) Notice: Subject to any disclaimer, the term of this patent is extended or adjusted under 35 U.S.C. 154(b) by 303 days.

(21) Appl. No.: 13/318,742

(22) PCT Filed: May 25, 2010

(86) PCT No.: PCT/JP2010/003478  
§ 371 (c)(1),  
(2), (4) Date: Nov. 3, 2011

(87) PCT Pub. No.: WO2010/137290  
PCT Pub. Date: Dec. 2, 2010

(65) Prior Publication Data  
US 2012/0049586 A1 Mar. 1, 2012

(30) Foreign Application Priority Data

May 26, 2009 (JP) ................................. 2009-126073  
Sep. 3, 2009 (JP) ................................. 2009-203253

(51) Int. Cl.  
*A47C 7/74* (2006.01)

(52) U.S. Cl.  
USPC .................................................... 297/180.12

(58) Field of Classification Search  
USPC ..................................... 297/180.12; 219/217  
See application file for complete search history.

(56) References Cited

U.S. PATENT DOCUMENTS

| 2,587,731 A | 3/1952 | Irving |
| 2002/0000742 A1 | 1/2002 | Wato et al. |
| 2005/0098684 A1* | 5/2005 | Gullerud et al. ............ 244/129.1 |
| 2009/0032518 A1 | 2/2009 | Ohashi et al. |

FOREIGN PATENT DOCUMENTS

| CN | 2829730 Y | 10/2006 |
| DE | 10 2007 012 631 A1 | 9/2008 |
| EP | 1 929 901 A1 | 6/2008 |
| JP | 51-18861 B1 | 10/1975 |
| JP | 06-301427 A | 10/1994 |
| JP | 2000-342381 A | 12/2000 |
| JP | 2002-012074 A | 1/2002 |
| JP | 2003-157955 A | 5/2003 |
| JP | 2007-209397 A | 8/2007 |
| JP | 2009-268718 A | 11/2009 |
| WO | WO 2007/097445 A1 | 8/2007 |
| WO | WO 2007/102500 A1 | 9/2007 |

OTHER PUBLICATIONS

International Search Report for International Application No. PCT/JP2010/003478, dated Jul. 20, 2010, 3 pages.  
Extended European Search Report in corresponding European Application No. 10 78 0251.4, dated Jan. 30, 2014, 11 pages.

* cited by examiner

*Primary Examiner* — Milton Nelson, Jr.  
(74) *Attorney, Agent, or Firm* — Brinks Gilson & Lione

(57) ABSTRACT

A planar heating device and a seat equipped with the device include: first and second warming heaters connected in parallel with electric power source; thermistor; thermostat connected in series with second warming heater; a heating part, i.e., first warming heater, that heats thermistor and thermostat; and controller to control temperatures of first and second warming heaters in accordance with temperature information from thermistor. For a period until thermostat turns off, quick-heating property is improved by energizing first and second warming heaters.

9 Claims, 11 Drawing Sheets

PLANAR HEATING DEVICE AND SEAT WITH SAME

This application is a 371 application of PCT/JP2010/003478 having an international filing date of May 25, 2010, which claims priority to JP2009-126073 filed on May 26, 2009 and JP2009-203253 filed on Sep. 3, 2009, the entire contents of which are incorporated herein by reference.

TECHNICAL FIELD

The present invention relates to a planar heating device and a seat equipped with the device.

BACKGROUND ART

A planar heating device of this type is traditionally configured including: a first warming heater and a second warming heater that are connected in parallel with an electric power source; and a thermostat that is connected in series with the second warming heater and heated by an auxiliary heater connected in series with the first warming heater, as disclosed in Patent Literature 1, for example. The thermostat is set such that, once it turns off, it will not turn back on. This setting secures rapid-heating property in a warming-up stage by energizing the two warming heaters and allows continuous energization of only the first warming heater after the turning-off of the thermostat.

Moreover, a vehicular seat equipped with a seat heater generally warms a user sitting on the seat by heat generated by the seat heater, via a face cover located above the seat heater. On the other hand, however, this configuration also allows warming of a seat pad located below the seat heater; therefore, it poses a problem of a heat loss, i.e., warming something else other than the sitting user that is an object to be warmed. This results in unnecessary use of electric power.

In particular, at low ambient temperatures at which such seat heater is used, the seat pad absorbs the heat generated by the seat heater immediately after starting use of the heater. Therefore, this poses a problem of degrading rapid-heating property with which the sitting user rapidly comes to feel warmed via the face cover.

For this reason, in the conventional vehicular seat disclosed in Patent Literature 2, for example, the rapid-heating property is improved by locating the seat heater close to the face cover in such a manner that a heating element is held by wadding that located between the face cover and the seat pad. FIG. 14 shows the conventional seat with the heater disclosed in Patent Literature 2. The seat with the heater is configured including face cover 121, seat pad 122, wadding 123, and heating wire 124.

However, in the configuration of the conventional planar heating device, only the first warming heater is continued to be energized after turning-off of the thermostat. Unfortunately, the configuration offers no ability to feedback information of ambient temperatures. Therefore, a stable temperature of the warming heater becomes low at low ambient temperatures. By contrast, the stable temperature of the warming heater becomes high at high ambient temperatures. Hence, this poses a problem that the stable temperature of the warming heater varies in a manner opposite to user's desire, which impairs comfort of the user.

Moreover, after the turning-off of the thermostat, since only the first warming heater is energized with a constant electric power, the planar heating device will be held at a temperature at which a quantity of heat generated by the first warming heater is in equilibrium with a quantity of heat dissipation to the environment, resulting in almost no change in the temperature. Hence, there is a problem that the user becomes hard to feel warm, which impairs comfort of the user.

In addition, after the turning-off of the thermostat, the first warming heater is continued to be energized with the constant electric power, independently of high or low ambient temperatures, which leads to a problem of lack of energy saving.

Moreover, the conventional vehicular seat is configured to increase heat conductivity, i.e., to improve the rapid-heating property, by thinning a member located between the sitting user and the seat heater. This, however, does not improve heat insulating property toward below the seat heater. Therefore, there has been a problem that a heat loss toward below the seat heater is left unimproved, and the waste of electric power remains unimproved as well.

In addition, in the configuration of the conventional vehicular seat, the member between the sitting user and the seat heater is made thinner. This poses a problem that the configuration allows a contour of the heating wire to appear on the surface of the face cover, i.e., the contour of the heating wire appears as a concavo-convex shape of the face cover. The concavo-convex shape of the face cover causes a secondary problem that the shape, in long-term service, will permanently remain as a mark of the heating wire, and that the mark becomes more distinct with a stain of the face cover, which impairs texture and aesthetic value of the seat.

Patent Literature 1: Japanese Patent Unexamined Publication No. 2003-157955
Patent Literature 2: Japanese Patent Unexamined Publication No. 2000-342381

SUMMARY OF THE INVENTION

The present invention is established in order to overcome the aforementioned problems of conventional planar heating devices. An object of the present invention is to provide a planar heating device that features comfort and energy saving as well as rapid-heating property. Moreover, another object of the present invention is to overcome the aforementioned problems of conventional vehicular seats and to provide a vehicular seat equipped with a seat heater, which features improved rapid-heating property and improved energy saving.

The planar heating device according to the present invention includes: a first warming heater and a second warming heater connected in parallel with an electric power source; a thermistor heated by the first warming heater; a thermostat connected in series with the second warming heater and heated by the first warming heater; and a controller for controlling temperatures of the first warming heater and the second warming heater in accordance with temperature information from the thermistor. Moreover, the vehicular seat according to the invention includes: a seat heater disposed between a seat pad and a face cover, with the seat heater warming a user sitting on the seat by means of energization of the heater; and a heat-insulating sheet disposed between the seat heater and the seat pad, with the heat-insulating sheet having higher heat-insulating property than the seat pad. The heat-insulating sheet is disposed in a predetermined area instead of an entire area corresponding to the seat pad.

In accordance with the planar heating device according to the present invention, the rapid-heating property is secured by energizing both the first and second warming heaters after turning-on of the electric power source. Moreover, temperature of the first warming heater is controlled to a temperature that the user desires, in accordance with the temperature information from the thermistor; therefore, a controlled stable temperature is not influenced by ambient temperatures as in a conventional way. This can improve comfort of the user.

In addition, the temperature control of the first warming heater is performed by turning on/off the energization of the first warming heater in accordance with the temperature information from the thermistor. This can provide the user with appropriate temperature changes so as for the user to easily feel warm, which prevents the user from becoming insensitive to warmth due to constant temperature as before, thereby resulting in further improved comfort.

Moreover, after turning-off of the thermostat, the temperature control of the first warming heater is performed by turning on/off the energization of the first warming heater in accordance with the temperature information from the thermistor, but not by holding a supplied electric power constant as in a conventional way. Therefore, power consumption can be reduced to improve energy saving.

In addition, in the seat according to the present invention, it is possible to improve heat-insulation toward below the seat heater (toward the seat pad) so as to reduce a heat loss caused by warming the seat pad. This improves rapid-warming property, for the sitting user, of the seat heater even with the same supplied power. Also, even with a seat heater using lower power, it is possible to achieve equivalent rapid-warming property, resulting in energy saving. Moreover, the rapid-warming property is further improved by attaching the heat-insulating sheet to an area corresponding to a sensitive-to-warmth part of the user's body, resulting in improved advantages of the seat heater. Furthermore, temperature stability of the surface of the seat is improved by not attaching the heat-insulating sheet to areas where temperature-control components are located, thereby enhancing sitting user's feeling of being warmed. In this way, with the seat according to the present invention, it is achieved to improve the rapid-warming property of the seat heater for the sitting user, or to enhance energy saving while retaining the rapid-warming property.

DETAILED DESCRIPTION OF THE PREFERRED EMBODIMENTS

Figure 1:
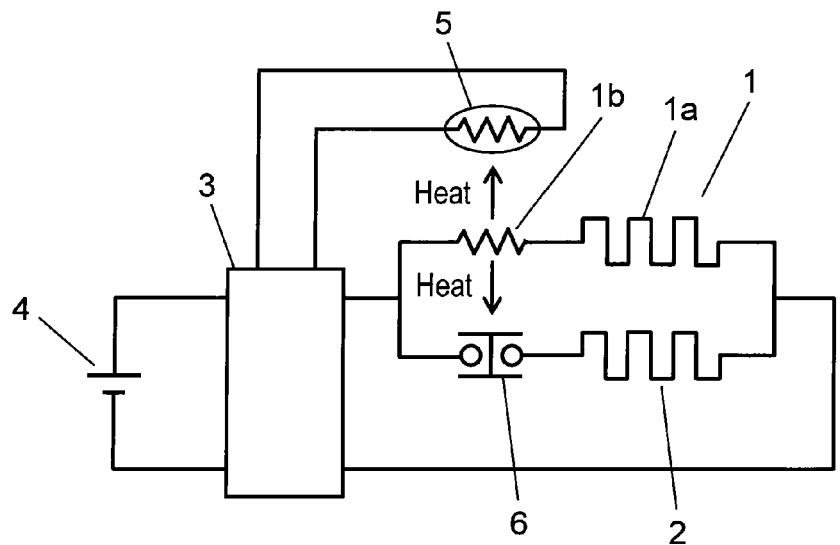
FIG. 1 is a circuit diagram of a planar heating device according to a first exemplary embodiment of the present invention.

A planar heating device according to the present invention includes: a first warming heater and a second warming heater connected in parallel with an electric power source; a thermistor; a thermostat connected in series with the second warming heater; a heating part for heating the thermistor and the thermostat; and a controller for controlling temperatures of the first warming heater and the second warming heater in accordance with temperature information from the thermistor. This configuration allows an improvement of rapid-heating property, for a period until the thermostat turns off, by means of energization of the two warming heaters.

Here, the first warming heater includes the heating part. With this configuration, for a period from turning-on of the power source until the turning-off of the thermostat, the two warming heaters are energized; after the turning-off of the thermostat, only the first warming heater is energized and the controller controls the temperature of the first warming heater in accordance with the temperature information from the thermistor. Consequently, for the period until the turning-off of the thermostat, the rapid-heating property is improved by energization of the two warming heaters.

Moreover, after the turning-off of thermostat, the thermistor detects ambient temperatures (including temperature of the planar heating device) such that the temperature of the first warming heater is controlled. Accordingly, when at lower ambient temperatures, the planar heating device is controlled to be at a user-desired temperature by increasing an amount of the energization of the first warming heater. In contrast, when at higher ambient temperatures, the planar heating device is controlled to be at a user-desired temperature by decreasing the amount of the energization of the first warming heater.

Moreover, on-off control, for example, is employed as a temperature control of the first warming heater after the turning-off of the thermostat, such that a user is provided with appropriate temperature changes so as to easily feel warm. In addition, after the turning-off of the thermostat, the temperature control of the first warming heater is performed by turning on/off the energization of the first warming heater in accordance with the temperature information from the thermistor, but not by holding a supplied electric power constant as in a conventional way. Therefore, power consumption can be reduced to improve energy saving.

Moreover, the planar heating device according to the present invention is such that the first warming heater includes a main heater and an auxiliary heater that are connected in series with one another, and the auxiliary heater is the heating part. Therefore, since the thermostat and the thermistor are heated by the same auxiliary heater, fluctuations are small in a temperature correlation between a temperature at which the thermostat starts to operate and a temperature of the thermistor at the time. And, until at least the thermostat starts to operate, the rapid-heating property is improved by securely energizing the two warming heaters.

Moreover, the planar heating device according to the present invention further includes two auxiliary heaters, i.e., the heating part, connected with the first warming heater. Of the two auxiliary heaters, one of the auxiliary heaters heats the thermistor, and the other heats the thermostat. With this configuration, the first and second warming heaters are easy to be controlled by separately setting a temperature of each of the auxiliary heaters.

Moreover, after the thermostat operates to halt heating by the second warming heater, the controller controls the temperature of the first warming heater in accordance with the temperature information from the thermistor. With this configuration, the rapid-heating property can be improved by energizing the first and second warming heaters for the period from the turning-on of the power source until the thermostat starts to operate. Moreover, after the thermostat starts to operate, the controller can feedback information of ambient temperatures, by controlling the temperature of the first warming heater in accordance with the temperature information from the thermistor. Furthermore, in a stable state, the supplied power can be varied, instead of being held constant, by means of the on-off control or the like so as to vary a quantity of the generated heat, which thereby causes the user to easily feel warm, leading to improved comfort. In addition, in the stable state, the varying of the supplied power by the on-off control or the like, instead of constant supplied power, can reduce the power consumption to improve energy saving.

Moreover, the planar heating device according to the present invention is such that a period of time from halting the heating by the second warming heater until starting to control the temperature of the first warming heater is within not more than five minutes. This allows the comfort to be kept without impairing user's feeling of warmth.

In addition, the thermostat starts to operate within not more than five minutes after the turning-on of the power source. This allows a quantity of heat generated by the second warming heater to increase to some extent, up to within a level above which the quantity is not safe, resulting in improved rapid-heating property.

Moreover, the thermostat continuously operates to halt the heating by the second warming heater, during a period of controlling the temperature of the first warming heater in accordance with the temperature information from the thermistor. This allows the temperature of the thermostat to decrease to an on-operation temperature, which causes the second warming heater to be re-energized to generate heat until the temperature of the thermostat reaches an off-operation temperature. Repeating of this procedure eliminates user's uncomfortable feeling caused by such repeated on-off operation of the second warming heater, resulting in improved comfort. In particular, this improvement of comfort is more advantageous in the case where the quantity of the heat generated by the second warming heater is large, because the user can remarkably feel such repetition of on-off operation of the second warming heater.

The planar heating device described above is configured to be disposed between a seat pad and a face cover of a seat. Between the planar heating device and the seat pad, a heat-insulating sheet is disposed which has a higher heat-insulating property than the seat pad, with the heat-insulating sheet being disposed in a predetermined area instead of an entire area corresponding to the seat pad. With this configuration, the heat-insulation sheet reduces heat conduction from the planar heating device to the seat pad, thereby reducing a heat loss toward below the planar heating device. This improves rapid-warming property for the sitting user compared with a seat without the heat-insulating sheet, and reduces the power consumption of the planar heating device, leading to improved energy saving.

Moreover, the heat-insulating sheets are disposed at areas with which parts of a sitting user's body contact, with the parts including at least one of user's thighs, center of buttocks, back, lumbar, shoulders, and center of scapulas. Since these parts are sensitive-to-warmth ones of the sitting user's body, a concentrative arrangement of the sheets at these areas improves the rapid-warming property for the user. Moreover, even with a lower electric power, equivalent user's feeling of being warmed can be obtained by enhancing the rapid-warming property locally at the areas where the user is easy to feel warmed.

Here, the heat-insulating sheet is configured with closed-cell foam. Such heat-insulating sheet provides a higher heat-insulating property than the seat pad that is generally configured with open-cell foam, with the heat-insulating property being compatible with cushioning properties when the sheet is used in the seat.

Moreover, the heat-insulating sheet has a plurality of through-holes therein, which prevents air permeability from being decreased due to the attachment of the heat-insulating sheet, thereby reducing warm-and-humid feeling of the sitting user. Furthermore, in the seat in which the seat pad contains ventilation flues or breathing holes through which a fan blows air to the surface of the face cover, the air blowing is not impaired by the heat-insulating sheet because of the plurality of through-holes in the sheet.

In addition, the first warming heater and the second warming heater each have a heating wire that does not overlap with at least a part of the plurality of through-holes. This allows a heat loss caused by the through-holes to be minimum, resulting in improved rapid-warming property, enhanced energy saving, and reduced warm-and-humid feeling of the user.

Moreover, a planar heating device and a seat equipped with the device according to another aspect of the present invention include: a seat heater disposed between a seat pad and a face cover, the seat heater providing a user sitting on the seat with warmth when being energized; and a heat-insulating sheet disposed between the seat heater and the seat pad, the sheet having a higher heat-insulating property than the seat pad. The heat-insulating sheet is disposed in a predetermined area instead of an entire area corresponding to the seat pad.

Hereinafter, exemplary embodiments of the present invention will be described with reference to the accompanying drawings. It should be noted that the present invention is not limited to these exemplary embodiments.

First Exemplary Embodiment

A circuit diagram of a planar heating device according to a first exemplary embodiment of the present invention is shown in FIG. 1. In FIG. 1, first warming heater 1 and second warming heater 2 are connected in parallel with electric power source 4 via controller 3. First warming heater 1 includes main heater 1a and auxiliary heater 1b that are connected in series with one another. Auxiliary heater 1b is disposed adjacent to thermistor 5 connected with controller 3 and thermostat 6 connected in series with second warming heater 2, and heats both thermistor 5 and thermostat 6. Note that first warming heater 1 is one example of a heating part that heats both thermistor 5 and thermostat 6.

Thermostat 6 is set in advance such that T0 is on-temperature at which the thermostat turns on a path, while T1 is off-temperature at which the thermostat turns off the path, where T0<T1. Controller 3 controls a contour temperature of the planar heating device to within a predetermined temperature range by comparing a detection temperature of thermistor 5 with predetermined reference temperatures T2 and T3 in such a manner that when the detection temperature of thermistor 5 is T2 or more, energization of first warming heater 1 and second warming heater 2 is halted, and that when the detection temperature of thermistor 5 is T3 or less, where T3 is less than T2, the energization of first warming heater 1 and second warming heater 2 is performed. Incidentally, T3 is set at least to a temperature higher than T0.

The planar heating device described above is disposed under a face cover of a seat of a vehicle, for example, and used for warming a user sitting on the seat. In this case, it is necessary to dispose thermistor 5 at an area where a correlation can be obtained between temperatures of the user's sitting place and the area. For this reason, thermistor 5 is disposed adjacent to auxiliary heater 1b, at the area under the face cover of the seat and slightly posterior to a location where the sitting user's buttocks contact with a seat surface of the seat, for example. In addition, thermostat 6 as well is disposed adjacent to the area. Main heater 1a is disposed under the face cover of the seat, i.e., the face cover of the seat, such that the heater mostly faces human body parts that are sensitive to being warmed, including thighs, buttocks, a lumbar, a back, and a below-shoulder region of the user sitting on the seat, for example. Second warming heater 2 is disposed under the face cover of the seat at an area which, for example, overlaps with main heater 1a or surrounds the periphery of main heater 1a.

Hereinafter, functions of the configuration described above will be described.

Figure 2:
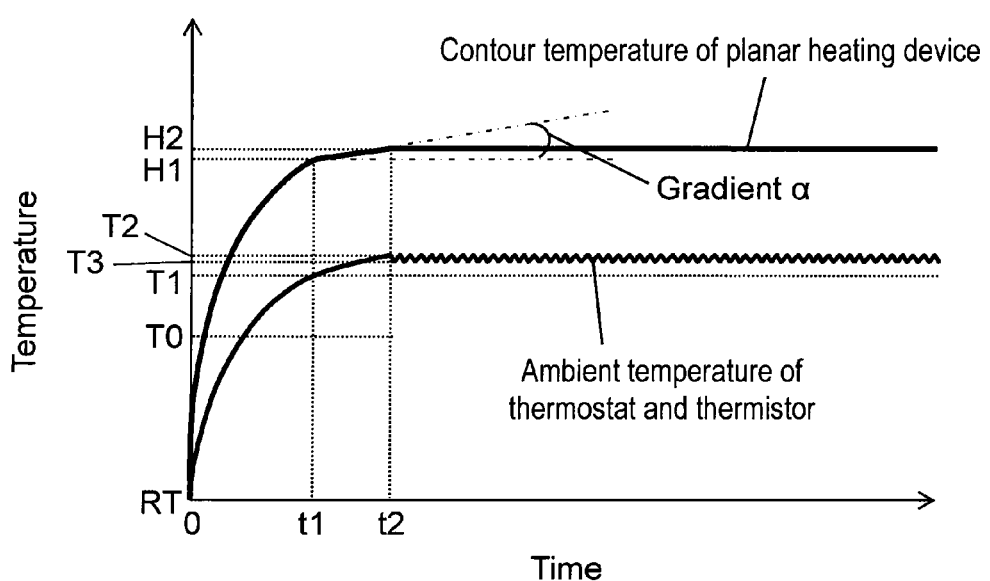
FIG. 2 is a graph showing temperature control of the planar heating device according to the exemplary embodiment.

FIG. 2 shows a graph illustrating temperature control of the planar heating device according to the first exemplary embodiment. In FIG. 2, for a period from starting of the energization until time t1, first and second warming heaters 1 and 2 are both energized to increase the contour temperature of the planar heating device and ambient temperatures of thermostat 6 and thermistor 5, from room temperature RT.

In particular, the contour temperature of the planar heating device has very a high rapid-heating property because of both first and second warming heaters 1 and 2 being energized, resulting in a very high rate of temperature rising. In this case, both main heater 1a and second warming heater 2 are disposed at areas under a face cover of the seat, i.e., the face cover of the seat, with the areas facing body parts of the user sitting on the seat, including: thighs, buttocks, a lumbar, a back, and a below-shoulder region. This causes both heat generated by main heater 1a and heat generated by second warming heater 2 to be added and conducted to the body parts via the face cover of the seat; therefore, the user can rapidly have a feeling of being warmed. Moreover, since second warming heater 2 is disposed under the face cover of the seat at circumferences of the areas facing the body parts including thighs, buttocks, a lumbar, a back, and a below-shoulder region, corresponding portions of the face cover of the seat are also warmed by the heat generated by second warming heater 2. Accordingly, an entire surface of the face cover of the seat becomes warm.

Note that, by adjusting auxiliary heater 1b such that time t1 is set to not more than five minutes, a quantity of the heat generated by main heater 1a is increased up to within a level above which the quantity is not safe, thereby resulting in further increased the rapid-heating property.

At time t1, when thermostat 6 reaches temperature T1, thermostat 6 turns off an energizing path. This halts the energization of second warming heater 2, but allows the energization of first warming heater 1 (main heater 1a and auxiliary heater 1b) to continue. After that, for a period until time t2, main heater 1a and auxiliary heater 1b of first warming heater 1 are left in a state of being energized.

Here, a quantity of the heat generated by first warming heater 1 is set in advance such that, for the period from time t1 to time t2, a gradient "a" of the contour temperature (from H1 to H2) of the planar heating device with respect to time is positive, i.e., at least not zero or less. With the configuration, even when thermostat 6 turns off to halt the energization of second warming heater 2, the contour temperature of the planar heating device does not decrease due to heat generated by first warming heater 1, thereby retaining user's comfort without impairing user's feeling of warmth. Note that, for the period from time t1 to time t2, in case the gradient of the contour temperature (from H1 to H2) of the planar heating device with respect to time is zero or less, it is possible to retain the user's comfort without impairing the user's feeling of warmth by adjusting the period of time (t2−t1) to within not more than five minutes.

Next, at time t2, when temperature of thermistor 5 heated by auxiliary heater 1b reaches T2, controller 3 starts on-off control of power source 4 in accordance with temperature information from thermistor 5. That is, when the detection temperature of thermistor 5 is T2 or more, the energization of first warming heater 1 is halted; when the detection temperature of thermistor 5 is T3 or less, the energization of first warming heater 1 is performed. Since a difference in temperature between T2 and T3 is set small, the contour temperature of the planar heating device becomes stable at H2. Here, a temperature setting unit capable of optionally setting H2 is installed to control the temperature of the planar heating device to a temperature desired by the user. This control is performed based upon a correlation among H2, T2, and T3 which is examined and determined in advance.

Note that, since the temperature difference between T2 and T3 is set small, even when controller 3 turns off power source 4, the temperature of thermistor 5 reaches T3 in a short time, which allows power source 4 to be turned on to energize auxiliary heater 1b, thereby heating thermistor 5 and thermostat 6. Accordingly, after time t2, temperature of thermostat 6 does not decrease to T0 or less, which does not turns on thermostat 6 to connect the energizing path with second warming heater 2.

With the functions described above, since first warming heater 1 is controlled to a temperature desired by the user in accordance with the temperature information from thermistor 5, the resulting stable temperature is not influenced by the ambient temperatures as in a conventional way, thereby resulting in improved comfort of the user. Moreover, after the turning-off of thermostat 6, temperature of first warming heater 1 is controlled by turning on/off the energization of the first warming heater 1 in accordance with the temperature information from the thermistor 5, but not by holding a supplied electric power constant as in a conventional way. This allows power consumption to be reduced to improve energy saving.

Note that, when the temperature difference between T2 and T3 is set slightly larger (however, T0<T3) such that the contour temperature of the planar heating device changes appropriately in the vicinity of H2, this provides the user with appropriate temperature changes, causing the user to easily feel warm. This prevents the user from becoming insensitive to warmth due to changeless temperature as in a conventional way, thereby resulting in further improved comfort.

Moreover, first and second warming heaters 1 and 2 may be configured with a combination of a plurality of heaters. That is, the number of the heaters is not limited. For example, when the planar heating device is used as one that is attached to a seat of a vehicle, first and second warming heaters 1 and 2 may be disposed uniformly. In this case, the warming heaters may be effectively portioned to be used at areas of the seat, corresponding to user's buttocks and thighs, flanks and lumbar, back, and below-shoulder region.

Moreover, in the exemplary embodiment, auxiliary heater 1$b$ is used to heat thermostat 6 and thermistor 5; however, in place of auxiliary heater 1$b$, first warming heater 1 may be used to heat thermostat 6 and thermistor 5. In this case, thermostat 6 and thermistor 5 are disposed on first warming heater 1 such that thermostat 6 and thermistor 5 are heated by first warming heater 1. Therefore, it is necessary to give design considerations to such arrangement so as to prevent the user from having a feeling of a foreign body around the surface of warming.

Second Exemplary Embodiment

Figure 3:
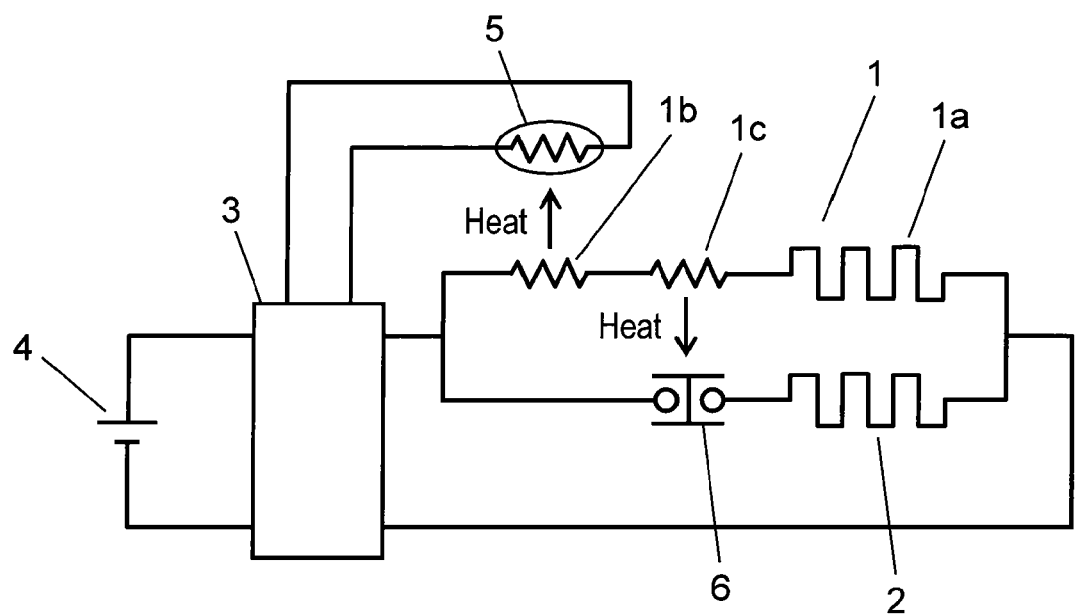
FIG. 3 is a circuit diagram of a planar heating device according to a second exemplary embodiment of the present invention.

A circuit diagram of a planar heating device according to a second exemplary embodiment of the present invention in FIG. 3. In FIG. 3, first warming heater 1 and second warming heater 2 are connected in parallel with electric power source 4 via controller 3. First warming heater 1 is configured with main heater 1$a$ and auxiliary heaters 1$b$ and 1$c$ which are connected in series with one another. Auxiliary heater 1$b$ is disposed adjacent to thermistor 5 connected with controller 3, and heats thermistor 5. The other auxiliary heater 1$c$ is disposed adjacent to thermostat 6 connected in series with second warming heater 2, and heats thermostat 6.

That is, a difference from the first exemplary embodiment is in that thermostat 6 is heated not by auxiliary heater 1$b$ but by auxiliary heater 1$c$ instead. In other words, the difference is that a heating part is implemented using auxiliary heaters 1$b$ and 1$c$. Here, auxiliary heater 1$c$ and thermostat 6 are disposed at areas, with which a user does not contact, under a face cover of a seat. For example, the areas are: one contacting with a backrest surface, in posterior to a seat surface of the seat; one facing a backseat, at a back-end of the seat surface; or one facing toward an instrument panel (not shown), at a front-end of the seat surface. Moreover, a quantity of heat generated by auxiliary heater 1$c$ is set in advance such that thermostat 6 reaches off-temperature T1 at time t1.

In the first exemplary embodiment, there is a possibility that the user has a feeling of a foreign body, depending on size of thermostat 6, because of thermostat 6 being located adjacent to auxiliary heater 1$b$. However, according to this exemplary embodiment, thermostat 6 is disposed not adjacent to auxiliary heater 1$b$. That is, thermostat 6 is disposed at an area which does not contact with the sitting user, with the user having no feeling of a foreign body at a warming surface. Moreover, by separately setting temperatures of auxiliary heaters 1$b$ and 1$c$, first and second warming heaters 1 and 2 are easy to be controlled.

Third Exemplary Embodiment

Figure 4:
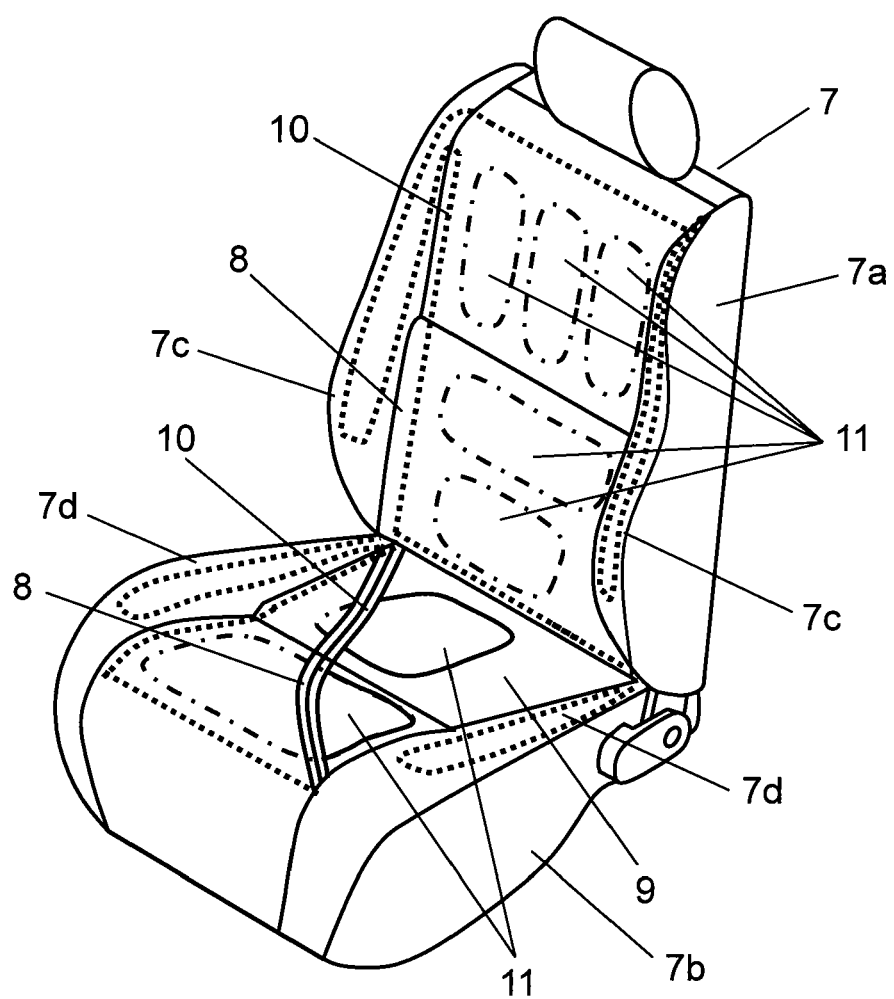
FIG. 4 is a partially cut-out perspective view of a vehicular seat according to a third exemplary embodiment of the present invention.

FIG. 4 is a partially cut-out perspective view of vehicular seat 7 according to a third exemplary embodiment of the present invention. In vehicular seat 7, planar heating device 10 disclosed in the first or the second exemplary embodiment is disposed between face cover 8 and seat pad 9. Moreover, between planar heating device 10 and seat pad 9, heat-insulating sheets 11 are disposed which have a higher heat-insulating property than seat pad 9. Note that, heat-insulating sheets 11 are disposed only in predetermined areas instead of an entire area of seat pad 9. Planar heating device 10 is disposed not only at backrest part 7$a$ and seat part 7$b$, but also at side-supports 7$c$ and 7$d$ of backrest part 7$a$ and seat part 7$b$, respectively. Note that, in FIG. 4, planar heating device 10 is represented by dotted lines, and heat-insulating sheets 11 are represented by dashed-dotted lines.

Figure 5:
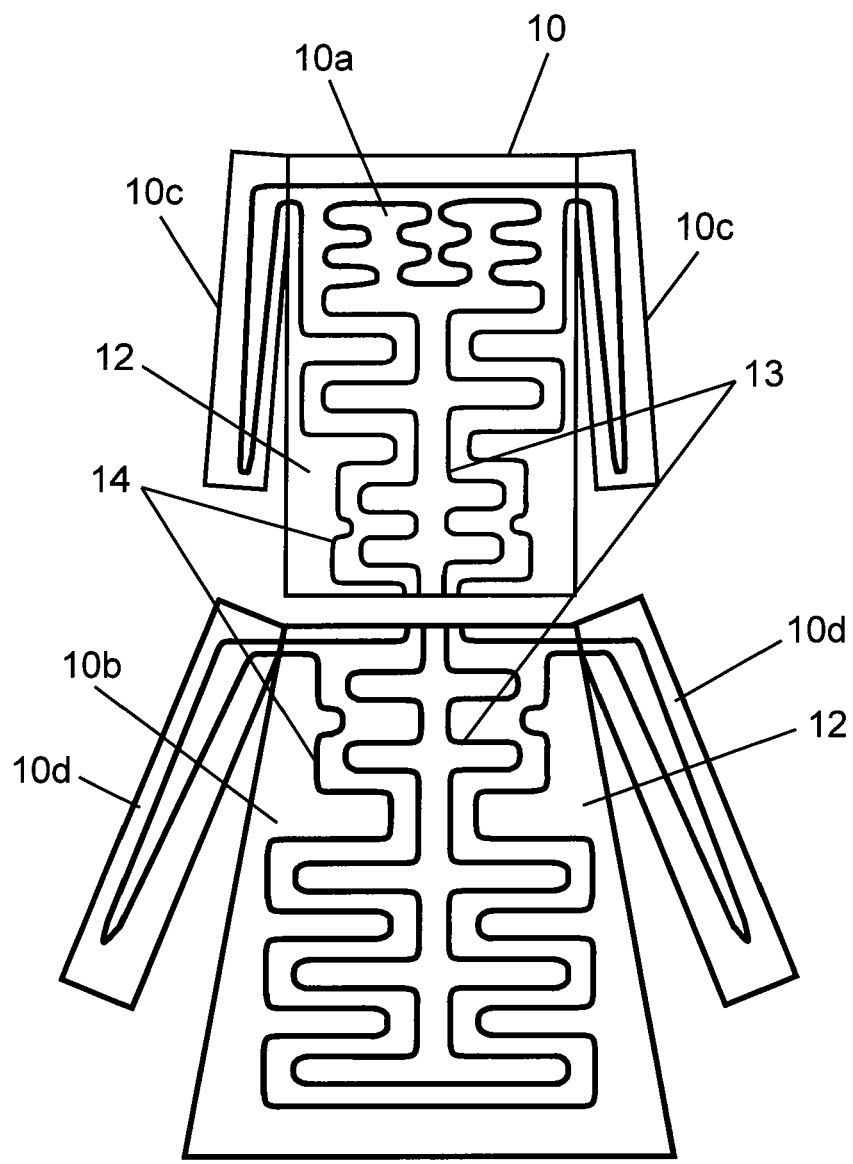
FIG. 5 is a plan view of a planar heating device of the vehicular seat according to the exemplary embodiment.

FIG. 5 is a plan view of planar heating device 10. Planar heating device 10 is configured including first warming heater 13 and second warming heater 14 that are disposed on base material 12. First warming heater 13 and second warming heater 14 are heating wires, both of which generate heat by a supplied electric power from a battery of a vehicle. Moreover, planar heating device 10 includes side-support wiring portions 10$c$ and 10$d$, in which second warming heater 14 is wired, corresponding to side-supports 7$c$ and 7$d$ of backrest part 7$a$ and seat part 7$b$, respectively.

Figure 6:
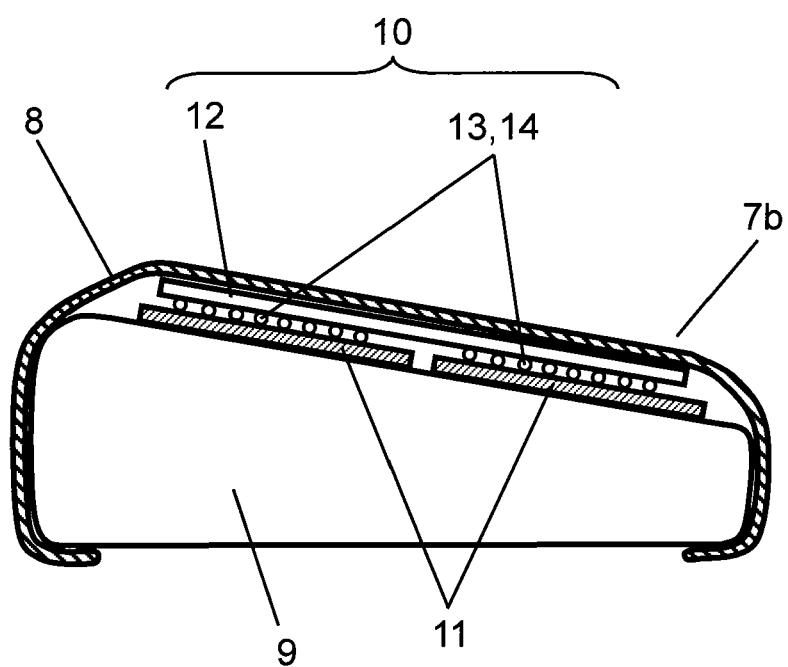
FIG. 6 is a cross-sectional view of a seat part of the vehicular seat according to the exemplary embodiment.

FIG. 6 is a cross-sectional view of seat part 7$b$ of vehicular seat 7. Note that, the seat part is not a backrest of the seat, but a part with which user's buttocks and thighs contact when a user sits on the seat. As shown in FIG. 6, seat part 7$b$ includes planar heating device 10 and heat-insulating sheets 11, which are disposed, in this order from the side of face cover 8, between seat pad 9 and face cover 8.

Hereinafter, operation and functions of thus-configured vehicular seat 7 will be described. As shown in FIGS. 4 and 6, heating of seat pad 9 by planar heating device 10 is reduced by attaching heat-insulating sheets 11 between planar heating device 10 and seat pad 9, with the sheets having a higher heat-insulating property (i.e., having lower thermal conductivity) than seat pad 9. That is, heat dissipation (i.e., a heat loss) toward seat pad 9 is reduced. This enhances rapid-warming property for the sitting user and user's feeling of being warmed at low temperatures, i.e., in a low-temperature ambient environment in a vehicle interior. Moreover, it is possible to increase temperature of a seat surface. Also, even with a smaller quantity of the generated heat, i.e., a lower electric power, it is possible to retain the same rapid-warming property or to hold the same temperature of the seat surface, leading to improved energy saving.

Figure 7:
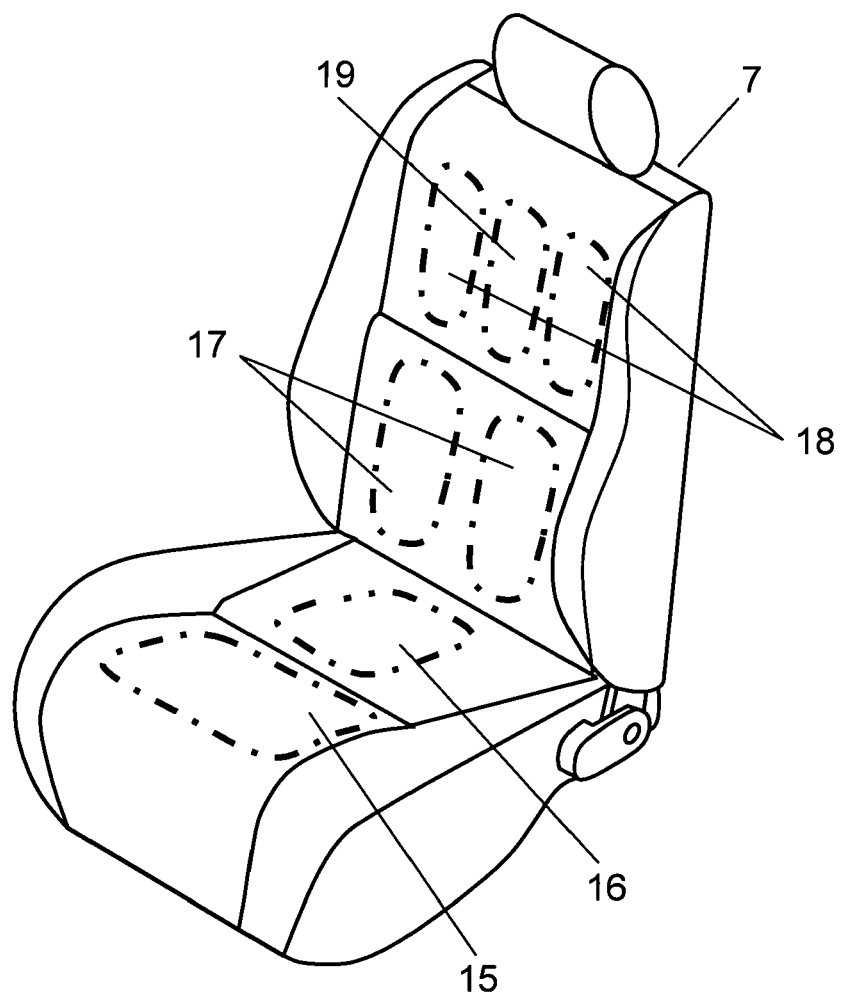
FIG. 7 is a perspective view of the vehicular seat according to the exemplary embodiment.

Note that, heat-insulating sheets 11 are disposed at predetermined areas but not over the entire area of seat pad 9. The sheets are disposed at the areas that, for example, include one facing planar heating device 10 and one corresponding to the heating wires of planar heating device 10. In particular, advantages of heat-insulating sheets 11 are improved when the sheets are attached to areas of the seat, with which the user contacts when sitting on the seat, i.e., contact areas of user's thighs, center of buttocks, back and laterals-of-lumbar regions, shoulders, and center of scapulas, as shown in a perspective view in FIG. 7. This is because as follows. When the user is sitting on vehicular seat 7, each of the contact areas with which user's body parts contact, provides the user with high contact pressures to the seat surface, allowing the user to easily feel being warmed at the area, in the case of the contact areas being set at thigh contact area 15, center-of-buttocks contact area 16, back and laterals-of-lumbar contact areas 17, shoulder contact areas 18, and center-of-scapulas contact area 19.

In particular, thigh contact area 15 is one at which the user tends to be in a short distance to planar heating device 10 because thigh contact area 15 is subjected to higher contact pressures to the seat surface than user's back side area, which thereby compresses members such as urethane that configure face cover 8. Moreover, thigh contact area 15 is one at which the user is easy to feel being warmed because the user has a smaller amount of clothing at the thigh contact area than those at the other contact areas. Furthermore, center-of-scapulas contact area 19 corresponds to a human body part close to a spinal cord, where a larger amount of heat is dissipated from the inside of the body. Therefore, since warming of this contact area can inhibit the heat dissipation to the outside of the human body, this contact area is advantageous in holding user's feeling of warmth.

In the present invention, the rapid-warming property is improved by attaching heat-insulating sheets 11 to such areas, which are advantageous for the user to easily feel being warmed and to hold the user's feeling being warmed, including thigh contact area 15, central-region-of-buttocks contact area 16, back and laterals-of-lumbar contact areas 17, shoulder contact areas 18, and central-region-of-scapulas contact area 19. Moreover, the temperature of the seat surface in this case becomes higher than that with planar heating device 10 energized even with the same electric power. In addition, even with a smaller quantity of generated heat, i.e., a lower electric power, it is possible to retain the same rapid-warming property and to hold the same temperature of the seat surface, leading to improved energy saving.

It should be noted that, the areas to which heat-insulating sheets 11 are attached are not limited to those described above; therefore, it is possible to optionally set areas including one where the rapid-heating property is desired to be improved and one where energy saving is desired to be improved.

Incidentally, when face cover 8 is made excessively thin in an attempt to improve the rapid-warming property for the sitting user, there is a problem that a pattern of such as wear, stain, and print appears in the face cover, in long-term service, particularly in the case where planar heating device 10 employs a heating wire or the like. Such appearance of the pattern is attributed to presence or absence of the heating wire under the face cover surface, which causes a difference of the face cover surface, in small concavo-convex shape and in hardness, leading to the appearance where the wire is present. However, the use of this exemplary embodiment improves the rapid-warming property for the sitting user without making face cover 8 thinner than required.

Moreover, heat-insulating sheet 11 for use in the present invention advantageously employs a fibrous heat-insulating material such as glass wool, a foam heat-insulating material such as urethane foam, a vacuum heat-insulating material such as vacuum-packed urethane foam, or the like. In addition, since vehicular seat 7 is required to retain cushioning characteristics thereof for repeated loads by sitting users, a foam heat-insulating material with high restoring characteristics against compression is advantageously used, including polyurethane, polyethylene, polystyrene, and polyolefin. Furthermore, since seat pad 9 generally employs open-cell urethane foam so as to provide high cushioning characteristics required for vehicular seat 7, it is particularly advantageous for heat-insulating sheet 11 to employ closed-cell foam that has higher heat-insulating property than the open-cell urethane foam.

On the other hand, since the closed-cell foam is a harder material than the open-cell foam, the thickness of the closed-cell foam is preferably approximately 2 mm to 10 mm when used as heat-insulating sheet 11, with the cushioning characteristics thereof being taken into consideration. In addition, in order to improve the cushioning characteristics of the closed-cell foam, it is also advantageous to make local fine-holes in heat-insulating sheet 11 using such as a needle, in such a way that the fine-holes do not penetrate through the sheet. It should be noted that heat-insulating sheet 11 according to the present invention is not limited to those described above.

Fourth Exemplary Embodiment

Figure 8:
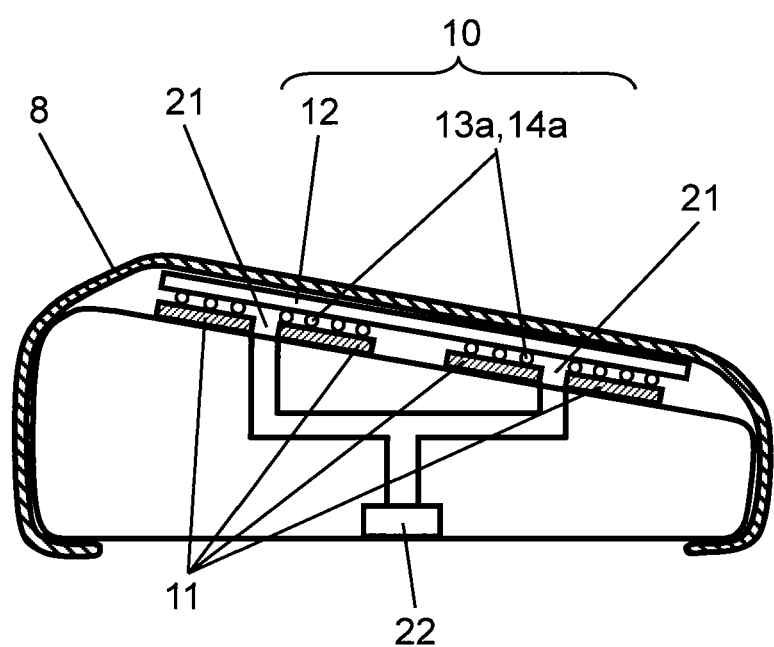
FIG. 8 is a cross-sectional view of a vehicular seat according to a fourth exemplary embodiment of the present invention.

FIG. 8 is a cross-sectional view of a seat part of vehicular seat 7 according to a fourth exemplary embodiment of the present invention. In FIG. 8, heat-insulating sheet 11 in which through-holes 21 are disposed is attached to a lower surface of planar heating device 10. Planar heating device 10 is configured such that heating wires 13a and 14a are disposed on base material 12 as a first warming heater and a second warming heater, respectively, with heating wires 13a and 14a being arranged so as not to overlap with through-holes 21. Hereinafter, operation and functions of thus-configured vehicular seat 7 will be described.

Planar heating device 10 is configured such that heating wires 13a and 14a each composed of such as a copper wire or a copper alloy wire are held by base material 12 composed of at least one or more fabric, urethane, or the like. Moreover, heat-insulating sheet 11 is desired to have less air permeability for better heat-insulating property; however, on the other hand, the sheet is expected to prevent the surface of the seat part from being moist with moisture such as sitting user's sweat. Therefore, the sheet is provided with through-holes 21 therein. With vehicular seat 7 in which fan 22 or the like blows air to a surface of a face cover via ventilation flues, breathing holes, or the like disposed in seat pad 9, these through-holes 21 are advantageous in preventing the sheet from obstructing the air blow.

In the case where planar heating device 10 described above is laminated with heat-insulating sheet 11 having through-holes 21, if the positions of heating wires 13a and 14a overlap with those of through-holes 21, heat generated by heating wires 13a and 14b is easy to be released via through-holes 21, leading to a large heat loss. Hence, in the configuration of the present invention, as shown in FIG. 8, a quantity of the heat loss is reduced by disposing heating wires 13a and 14b not to overlap with at least a part of through-holes 21. This improves the rapid-warming property and temperature performance for a sitting user as well as the air permeability, leading to additionally-improved energy saving of planar heating device 10. Note that, although the configuration has been illustrated and described with reference to the cross-sectional views of the seat parts in the third and fourth exemplary embodiments, the configuration advantageously provides the same functions for a backrest part as well.

Fifth Exemplary Embodiment

Figure 9:
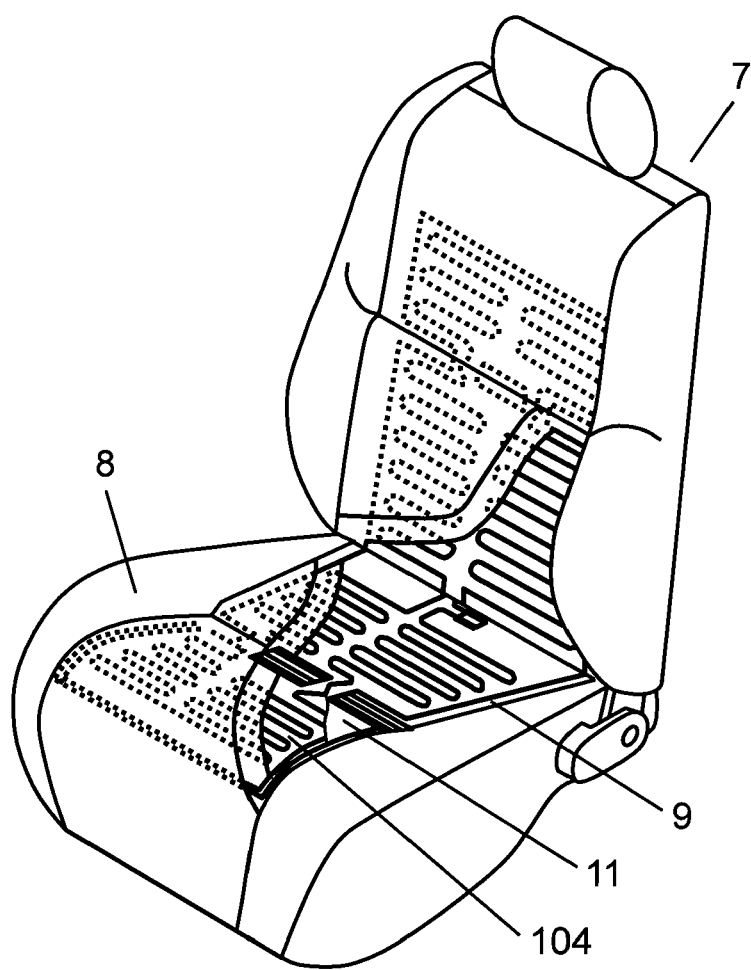
FIG. 9 is a perspective view of a vehicular seat according to a fifth exemplary embodiment of the present invention.
Figure 10:
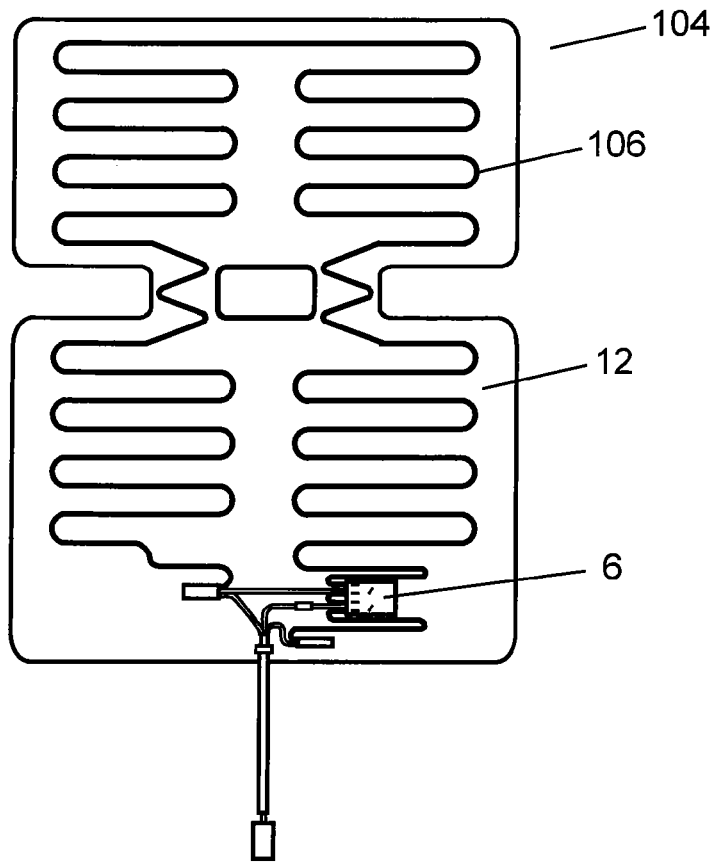
FIG. 10 is a plan view of a seat heater to be attached to the vehicular seat of FIG. 9.
Figure 11:
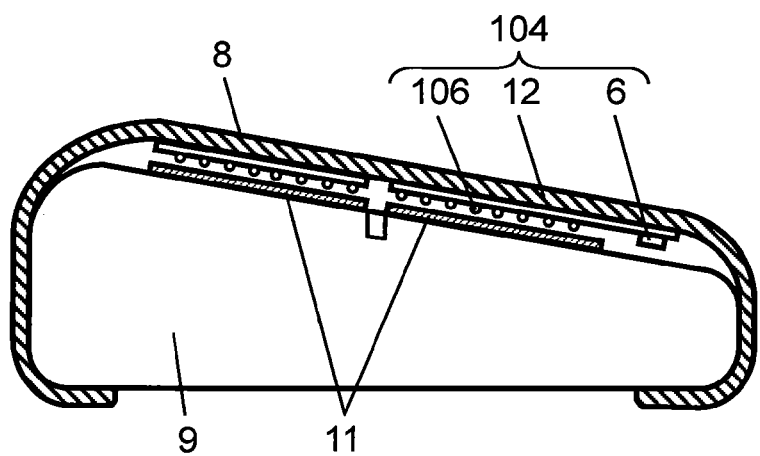
FIG. 11 is a cross-sectional view of a seat part of the vehicular seat of FIG. 9.

FIG. 9 is a perspective view of vehicular seat 7 according to a fifth exemplary embodiment of the present invention. FIG. 10 is a plan view of a seat heater, i.e., planar heating device 10, to be attached to this vehicular seat 7. FIG. 11 is a cross-sectional view of a seat part of vehicular seat 7. Note that, the seat part is not a backrest part of the seat, but a part of the seat with which user's thighs and buttocks contact when a user is sitting on the seat.

As shown in FIGS. 9 and 11, vehicular seat 7 is configured such that face cover 8 covers seat pad 9 that forms the shape of the seat. Moreover, seat heater 104 and heat-insulating sheet 11 are disposed, in this order from the side of the surface, between seat pad 9 and face cover 8. Seat heater 104 is configured, as shown in FIG. 10, such that heating wire 106 is disposed on base material 12. Temperature of the seat heater is controlled by thermostat 6. Hereinafter, operation and functions of thus-configured vehicular seat 7 will be described.

As shown in FIGS. 9 and 11, heat-insulating sheet 11 is disposed between seat heater 104 and seat pad 9, with the sheet having the higher heat-insulating property, i.e., lower heat conductivity, than seat pad 9. This reduces warming of seat pad 9 by seat heater 104, that is, reduces a heat loss (heat dissipation toward seat pad 9). This configuration improves the rapid-warming property for the sitting user and user's feeling of being warmed at low temperatures (in a low-temperature ambient environment in a vehicle interior). Moreover, temperature of a seat surface becomes higher. In addition, even with a smaller quantity of generated heat, i.e., a lower electric power, it is possible to retain the same rapid-warming property and to hold the same temperature of the seat surface, leading to improved energy saving.

Note that, heat-insulating sheet 11 is disposed in a predetermined area instead of an entire area of seat pad 9. For example, the sheet is disposed at the area that includes one facing seat heater 104 and one corresponding to heating wire 106 of seat heater 104.

Moreover, when face cover 8 is made excessively thin in an attempt to improve the rapid-warming property for the sitting user, there is a problem that a pattern of such as wear, stain, and print appears in the face cover, in long-term service, particularly in the case where seat heater 104 employs heating wire 106 or the like. Such appearance of the pattern is attributed to presence or absence of heating wire 106 under the face cover surface, which causes a difference of the face cover surface, in small concavo-convex shape and in hardness, leading to the appearance where heating wire 106 is present. However, the use of this exemplary embodiment improves the rapid-warming property for the sitting user without making face cover 8 thinner than required.

In addition, in the case where thermostat 6 is used to control the temperature of seat heater 104, energization of heating wire 106 is turned on and off by means of repeated on-and-off operation of thermostat 6, which causes upward and downward variations in the temperature of the seat surface. This poses a problem that the user senses such temperature variations, leading to degraded feeling of being warmed. To overcome the problem, heat-insulating sheet 11 is attached to a lower surface of seat heater 104, which improves heat-retention performance of an interior of vehicular seat 7. This inhibits the temperature variations of the seat surface during the on-and-off operation of thermostat 6. Incidentally, in the above configuration, as shown in FIG. 11, by attaching heat-insulating sheet 11 to an area excluding locations of temperature-control components such as thermostat 6, it is possible to reduce a time interval between on-operation and off-operation, compared with the case of the sheet being attached to the area including the locations. Accordingly, the temperature variations of the seat surface are further inhibited. It should be noted that the temperature-control components in the present invention are not limited to thermostat 6.

Note that, heat-insulating sheet 11 for use in the present invention advantageously employs a fibrous heat-insulating material such as glass wool, a foam heat-insulating material such as urethane foam, a vacuum heat-insulating material such as vacuum-packed urethane foam, or the like. In addition, since vehicular seat 7 is required to retain cushioning characteristics thereof for repeated loads by sitting users, a foam heat-insulating material with high restoring characteristics against compression is advantageously used, including polyurethane, polyethylene, polystyrene, and polyolefin. Furthermore, since seat pad 9 generally employs open-cell urethane foam so as to provide high cushioning characteristics required for vehicular seat 7, it is particularly advantageous for heat-insulating sheet 11 to employ closed-cell foam that has higher heat-insulating property than the open-cell urethane foam. On the other hand, since the closed-cell foam is a harder material than the open-cell foam, the thickness of the closed-cell foam is preferably approximately 2 mm to 10 mm when used as heat-insulating sheet 11, with the cushioning characteristics thereof being taken into consideration. In addition, in order to improve the cushioning characteristics of the closed-cell foam, it is also advantageous to make local fine-holes in heat-insulating sheet 11 using such as a needle, in such a way that the fine-holes do not penetrate through the sheet. It should be noted that heat-insulating sheet 11 according to the present invention is not limited to those described above.

Sixth Exemplary Embodiment

Figure 12:
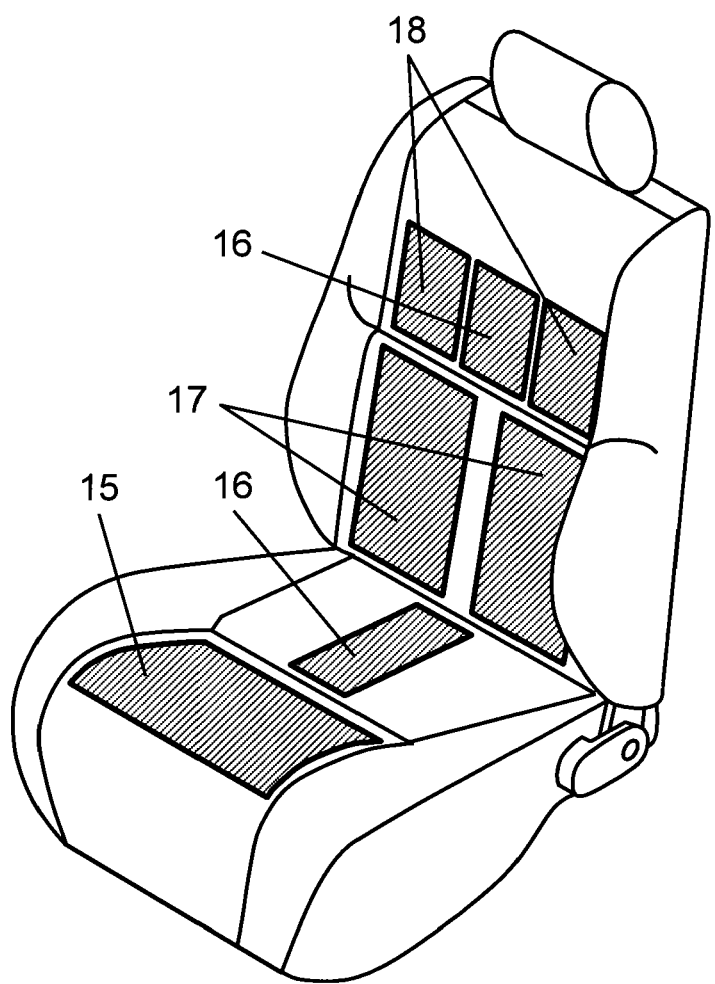
FIG. 12 is a perspective view of a vehicular seat according to a sixth exemplary embodiment of the present invention.

FIG. 12 is a perspective view of vehicular seat 7 according to a sixth exemplary embodiment of the present invention. As shown in FIG. 12, heat-insulating sheets 11 are attached to areas of the seat, with which a user contacts when sitting on the seat, i.e., contact areas of user's thighs, center of buttocks, back and laterals-of-lumbar regions, shoulders, and center of scapulas. Hereinafter, operation and functions of thus-configured vehicular seat 7 will be described.

When the user is sitting on vehicular seat 7, each of the contact areas with which the user's body parts contact, provides the user with high contact pressures to a seat surface, allowing the user to easily feel being warmed at the area, in the case of the contact areas being set on vehicular seat 7, including: at thigh contact area 15 with which user's thighs contact; center-of-buttocks contact area 16 with which a central region of user's buttocks contacts; back and laterals-of-lumbar contact areas 17 with which user's back and laterals of lumbar contact; shoulder contact areas 18 with which user's shoulders contact; and center-of-scapulas contact area 19 with which a central region of user's scapulas contact. In particular, thigh contact area 15 is one at which the user tends to be in a short distance to seat heater 104 because thigh contact area 15 is subjected to higher contact pressures to the seat surface than user's back side area, which thereby compresses members such as urethane that configure face cover 8. Moreover, thigh contact area 15 is one at which the user is easy to feel being warmed because the user has a smaller amount of clothing at the thigh contact area than those at the other contact areas. Furthermore, center-of-scapulas contact area 19 corresponds to a human body part where a large amount of heat of the inside of the body is dissipated. Therefore, since warming of this contact area can inhibit the heat dissipation to the outside of the human body, this contact area is advantageous in holding user's feeling of warmth.

In the present invention, the rapid-warming property is improved by attaching heat-insulating sheets 11 to such areas, which are advantageous for the user to easily feel being warmed and to hold the user's feeling being warmed, including thigh contact area 15, center-of-buttocks contact area 16, back and laterals-of-lumbar contact areas 17, shoulder contact areas 18, and center-of-scapulas contact area 19. Moreover, temperature of the seat surface becomes higher than that with seat heater 104 energized with the same electric power. In addition, even with a smaller quantity of generated heat, i.e., a lower electric power, it is possible to retain the same rapid-warming property and to hold the same temperature of the seat surface, leading to improved energy saving.

It should be noted that, in the present invention, the areas to which heat-insulating sheets 11 are attached are not limited to those described above; therefore, it is possible to optionally set areas including one where the rapid-heating property is desired to be improved and one where energy saving is desired to be improved.

Seventh Exemplary Embodiment

Figure 13:
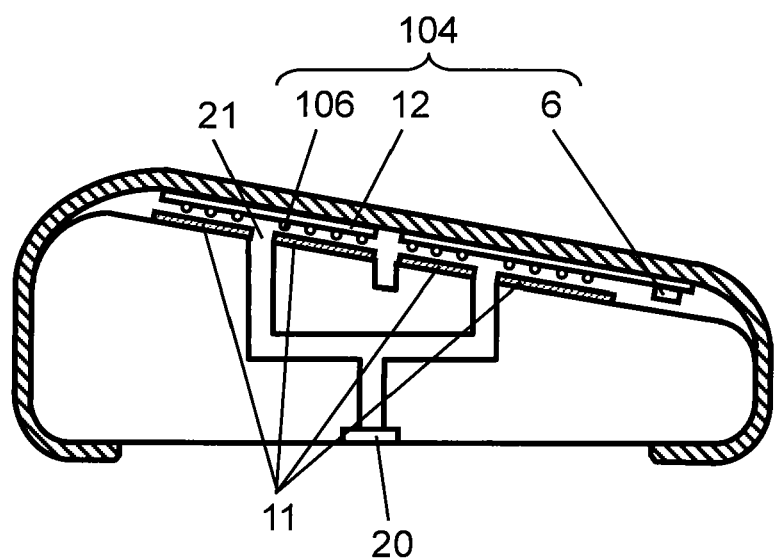
FIG. 13 is a cross-sectional view of a seat part of a vehicular seat according to a seventh exemplary embodiment of the present invention.
Figure 14:
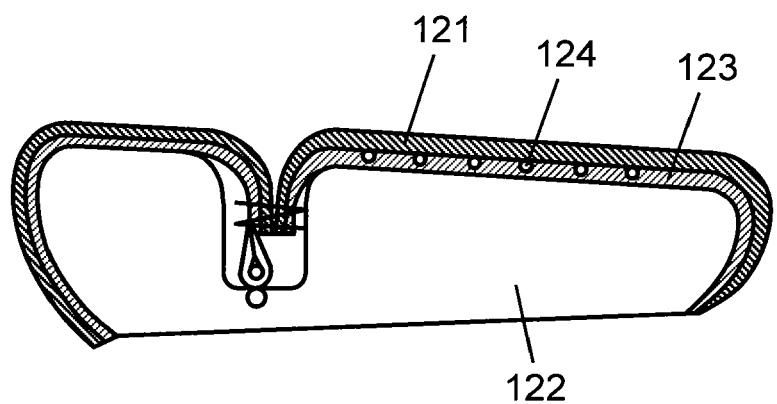
FIG. 14 is a cross-sectional view of a conventional vehicular seat.

FIG. 13 is a cross-sectional view of a seat part of vehicular seat 7 according to a seventh exemplary embodiment of the present invention. In FIG. 13, the seat part is configured such that heat-insulating sheet 11 provided with through-holes 21 is attached to a lower surface of seat heater 104, and seat heater 104 is configured such that heating wire 106 is disposed on base material 12, with heating wire 106 being arranged so as not to overlap with through-holes 21. Hereinafter, operation and functions of thus-configured vehicular seat 7 will be described.

Seat heater 104 is configured such that heating wire 106 composed of such as a copper wire or a copper alloy wire is held by base material 12 composed of at least one or more fabric, urethane, or the like. Moreover, heat-insulating sheet 11 is desired to have less air permeability for better heat-insulating property; however, on the other hand, the sheet is expected to prevent the surface of the seat part from being moist with moisture such as sitting user's sweat. Therefore, the sheet is provided with through-holes 21 therein. With vehicular seat 7 in which fan 22 or the like blows air to a surface of a face cover via ventilation flues, breathing holes, or the like disposed in seat pad 9, these through-holes 21 are advantageous in preventing the sheet from obstructing the air blow.

In the case where seat heater 104 described above is laminated with heat-insulating sheet 11 having through-holes 21, if the position of heating wire 106 overlaps with those of through-holes 21, heat generated by heating wire 106 is easy to be released via through-holes 21, leading to a large heat loss. Hence, in the configuration of the present invention, as shown in FIG. 13, a quantity of the heat loss is reduced by disposing heating wire 106 not to overlap with at least a part of through-holes 21. This improves the rapid-warming property and temperature performance for a sitting user as well as the air permeability, and additionally-improved energy saving of seat heater 104. Note that, although the configuration has been illustrated and described with reference to the cross-sectional views of the seat parts in the fifth to seventh exemplary embodiments, the configuration advantageously provides the same functions for a backrest part as well.

INDUSTRIAL APPLICABILITY

As described above, a planar heating device and a seat equipped with the device according to the present invention are capable of providing rapid-heating performance, great comfort, and high energy saving performance. Accordingly the invention is useful for warming a wide range of seats for use in vehicles, aircrafts, theaters, and so on.

The invention claimed is:

1. A planar heating device for use under a face cover of a seat, the seat including non-contact user areas, the planar heating device comprising:
   a first warming heater and a second warming heater connected in parallel with an electric power source;
   a thermistor;
   a thermostat connected in series with the second warming heater;
   a heating part for heating the thermistor and the thermostat; and
   a controller for controlling temperatures of the first warming heater and the second warming heater in accordance with temperature information from the thermistor,
   wherein the thermistor, the heating part, and the thermostat are configured to be disposed in the non-contact user areas of the seat, and
   wherein the controller controls the temperature of the first warming heater in accordance with the temperature information from the thermistor after the thermostat operates to halt heating by the second warming heater.

2. The planar heating device according to claim 1, wherein a time to start controlling the temperature of the first warming heater is not more than five minutes after halting heating from the second warming heater.

3. The planar heating device according to claim 1, wherein the thermostat starts to operate within five minutes after the electric power source is turned on.

4. The planar heating device according to claim 1, wherein the thermostat continuously operates to halt heating from the second warming heater while the temperature of the first warming heater is controlled in accordance with the temperature information from the thermistor.

5. A seat comprising:
   the first and second warming heaters of the planar heating device according to claim 1, the warming heaters disposed between a seat pad and the face cover of the seat; and
   a heat-insulating sheet disposed between the planar heating device and the seat pad, the heat-insulating sheet having a higher heat-insulation property than the seat pad,
   wherein the heat-insulating sheet is disposed in a predetermined area instead of an entire area corresponding to the seat pad.

6. The seat according to claim 5, wherein the heat-insulating sheet includes at least one of a human thigh contact area, a human center-of-buttocks contact area, a human back contact area, a human lumbar contact area, a human shoulder contact area, or a human center-of-scapulas contact area.

7. The seat according to claim 5, wherein the heat-insulating sheet includes closed-cell foam.

8. The seat according to claim 5, wherein the heat-insulating sheet includes a plurality of through-holes.

9. The seat according to claim 8, wherein the first warming heater and the second warming heater include a heating wire so disposed as not to overlap with at least a part of the plurality of through-holes.

* * * * *